(12) United States Patent
Itoh et al.

(10) Patent No.: US 10,171,004 B2
(45) Date of Patent: Jan. 1, 2019

(54) DC-DC CONVERTER

(71) Applicant: Murata Manufacturing Co., Ltd., Nagaokakyo-shi, Kyoto-fu (JP)

(72) Inventors: Junichi Itoh, Nagaokakyo (JP); Hayato Higa, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/904,679

(22) Filed: Feb. 26, 2018

(65) Prior Publication Data

US 2018/0183345 A1 Jun. 28, 2018

Related U.S. Application Data

(63) Continuation of application No. PCT/JP2016/071485, filed on Jul. 22, 2016.

(30) Foreign Application Priority Data

Aug. 28, 2015 (JP) ................. 2015-169417

(51) Int. Cl.
*H02M 3/335* (2006.01)
*H02M 1/32* (2007.01)
(Continued)

(52) U.S. Cl.
CPC ......... *H02M 3/33584* (2013.01); *H02M 1/32* (2013.01); *H02M 3/07* (2013.01);
(Continued)

(58) Field of Classification Search
CPC .................................................. H02M 3/335
(Continued)

(56) References Cited

U.S. PATENT DOCUMENTS

| 5,355,294 A | 10/1994 | De Doncker et al. |
| 9,112,429 B2 | 8/2015 | Ikeda et al. |

(Continued)

FOREIGN PATENT DOCUMENTS

| CN | 103684017 A | 3/2014 |
| JP | 2013-13220 A | 1/2013 |
| JP | 2014-508495 | 4/2014 |

OTHER PUBLICATIONS

International Search Report issued in International Application No. PCT/JP2016/071485, dated Oct. 11, 2016.
(Continued)

*Primary Examiner* — Adolf Berhane
*Assistant Examiner* — Nusrat Quddus
(74) *Attorney, Agent, or Firm* — Arent Fox LLP

(57) ABSTRACT

A DC-DC converter includes a full-bridge circuit connected to a primary winding of a transformer and a full-bridge circuit connected to a secondary winding of the transformer. The full-bridge circuit includes a first series circuit including a first set of switching elements, a second series circuit including a second set of switching elements, a first charge-discharge capacitor connected to a node between a first pair of the first switching elements and a node between a second pair of first switching elements, and a second charge-discharge capacitor connected to a node between the a first pair of the second switching elements and a node between a second pair of the second switching elements. The full-bridge circuit can operate in one of a full-bridge operation mode and a half-bridge operation mode. The disclosed DC-DC converter can constantly operate with high efficiency even when the variation range of a load is wide.

18 Claims, 13 Drawing Sheets

(51) Int. Cl.
  *H02M 3/07* (2006.01)
  *H02M 1/00* (2006.01)
(52) U.S. Cl.
  CPC .............. *H02M 2001/0032* (2013.01); *H02M 2001/0058* (2013.01)
(58) Field of Classification Search
  USPC .................................. 363/17, 19, 123–127
  See application file for complete search history.

(56) References Cited

U.S. PATENT DOCUMENTS

| | | | |
|---|---|---|---|
| 9,148,065 B2 | 9/2015 | Thomas et al. | |
| 2013/0002227 A1 | 1/2013 | Ikeda et al. | |
| 2014/0003095 A1 | 1/2014 | Thomas et al. | |
| 2014/0063885 A1* | 3/2014 | Itoh ...................... | H02M 7/487 363/132 |
| 2014/0085950 A1* | 3/2014 | Koyano ................ | H02M 5/293 363/123 |
| 2014/0104913 A1* | 4/2014 | Koyano ................ | H02M 5/293 363/149 |
| 2014/0126263 A1* | 5/2014 | Koyano ................ | H02M 5/293 363/148 |
| 2014/0185326 A1* | 7/2014 | Koyano ................ | H02M 5/293 363/2 |
| 2014/0192578 A1* | 7/2014 | Koyano ................ | H02M 5/293 363/149 |
| 2014/0226382 A1* | 8/2014 | Saito ..................... | H02M 5/293 363/124 |
| 2014/0226386 A1* | 8/2014 | Saito ..................... | H02M 5/293 363/132 |
| 2014/0233280 A1* | 8/2014 | Saito ..................... | H02M 5/293 363/37 |
| 2014/0247635 A1* | 9/2014 | Koyano ................ | H02M 5/297 363/148 |
| 2014/0247636 A1* | 9/2014 | Koyano ................ | H02M 5/297 363/148 |
| 2014/0369090 A1* | 12/2014 | Ueki ..................... | H02M 1/15 363/41 |

OTHER PUBLICATIONS

Written Opinion of the International Searching Authority issued in International Application No. PCT/JP2016/071485, dated Oct. 11, 2016.

* cited by examiner

FIG. 2

| | MODE | Vo | Vu | Vv | Cf1 | Cf2 | Q1 | Q2 | Q3 | Q4 | Q5 | Q6 | Q7 | Q8 |
|---|---|---|---|---|---|---|---|---|---|---|---|---|---|---|
| 0 LEVEL | (1) | 0 | V1/2 | V1/2 | CHARGE | CHARGE | ON | OFF | ON | OFF | OFF | ON | OFF | ON |
| | (2) | | V1/2 | V1/2 | CHARGE | CHARGE | OFF | ON | OFF | ON | ON | OFF | ON | OFF |
| | (3) | | V1/2 | V1/2 | DISCHARGE | CHARGE | OFF | ON | OFF | ON | OFF | ON | ON | ON |
| | (4) | | V1/2 | V1/2 | CHARGE | DISCHARGE | OFF | ON | OFF | OFF | ON | OFF | OFF | ON |
| | (5) | | V1 | V1 | NOT VARIED | NOT VARIED | ON | ON | ON | ON | ON | ON | OFF | OFF |
| | (6) | | 0 | 0 | NOT VARIED | NOT VARIED | OFF | OFF | OFF | OFF | OFF | OFF | ON | ON |
| FULL BRIDGE | (7) | V1 | V1 | 0 | NOT VARIED | NOT VARIED | ON | ON | ON | ON | OFF | OFF | OFF | OFF |
| | (8) | -V1 | 0 | V1 | NOT VARIED | NOT VARIED | OFF | OFF | OFF | OFF | ON | ON | ON | ON |
| | (9) | V1/2 | V1/2 | 0 | NOT VARIED | CHARGE | ON | ON | ON | OFF | OFF | OFF | OFF | ON |
| | (10) | | V1/2 | 0 | NOT VARIED | DISCHARGE | ON | ON | OFF | ON | OFF | OFF | OFF | ON |
| | (11) | | V1/2 | 0 | CHARGE | NOT VARIED | ON | OFF | ON | OFF | ON | OFF | ON | ON |
| | (12) | | V1/2 | 0 | DISCHARGE | NOT VARIED | OFF | ON | ON | OFF | ON | OFF | ON | ON |
| HALF BRIDGE | (13) | -V1/2 | 0 | V1/2 | NOT VARIED | CHARGE | OFF | OFF | OFF | ON | ON | ON | ON | OFF |
| | (14) | | 0 | V1/2 | NOT VARIED | DISCHARGE | OFF | OFF | ON | OFF | ON | ON | ON | OFF |
| | (15) | | 0 | V1/2 | CHARGE | NOT VARIED | OFF | OFF | ON | ON | OFF | ON | OFF | OFF |
| | (16) | | 0 | V1/2 | DISCHARGE | NOT VARIED | ON | OFF | ON | ON | OFF | ON | OFF | OFF |

MODE(7)

MODE(8)

MODE(1)

MODE(2)

MODE(3)

MODE(4)

MODE(5)

MODE(6)

MODE(11)

MODE(12)

MODE(9)

MODE(10)

MODE(13)

MODE(14)

MODE(15)

MODE(16)

FIG. 7

|    | A       | B    | C   | D    | E       | F    | G   | H    | I       |
|----|---------|------|-----|------|---------|------|-----|------|---------|
| 1  | (1)or(2) | (10) | (7) | (9)  | (5)or(6) | (14) | (8) | (13) | (5)or(6) |
| 2  | (1)or(2) | (10) | (7) | (9)  | (5)or(6) | (14) | (8) | (16) | (1)or(2) |
| 3  | (1)or(2) | (10) | (7) | (9)  | (5)or(6) | (14) | (8) | (16) | (5)or(6) |
| 4  | (1)or(2) | (10) | (7) | (9)  | (5)or(6) | (16) | (8) | (14) | (1)or(2) |
| 5  | (1)or(2) | (10) | (7) | (9)  | (5)or(6) | (16) | (8) | (14) | (5)or(6) |
| 6  | (1)or(2) | (10) | (7) | (9)  | (5)or(6) | (16) | (8) | (15) | (5)or(6) |
| 7  | (1)or(2) | (10) | (7) | (12) | (1)or(2) | (14) | (8) | (13) | (5)or(6) |
| 8  | (1)or(2) | (10) | (7) | (12) | (1)or(2) | (14) | (8) | (16) | (1)or(2) |
| 9  | (1)or(2) | (10) | (7) | (12) | (1)or(2) | (14) | (8) | (16) | (5)or(6) |
| 10 | (1)or(2) | (10) | (7) | (12) | (1)or(2) | (16) | (8) | (14) | (1)or(2) |
| 11 | (1)or(2) | (10) | (7) | (12) | (1)or(2) | (16) | (8) | (14) | (5)or(6) |
| 12 | (1)or(2) | (10) | (7) | (12) | (1)or(2) | (16) | (8) | (15) | (5)or(6) |
| 13 | (1)or(2) | (10) | (7) | (12) | (5)or(6) | (13) | (8) | (14) | (5)or(6) |
| 14 | (1)or(2) | (10) | (7) | (12) | (5)or(6) | (13) | (8) | (14) | (1)or(2) |
| 15 | (1)or(2) | (10) | (7) | (12) | (5)or(6) | (13) | (8) | (15) | (5)or(6) |
| 16 | (1)or(2) | (10) | (7) | (12) | (5)or(6) | (15) | (8) | (16) | (1)or(2) |
| 17 | (1)or(2) | (10) | (7) | (12) | (5)or(6) | (15) | (8) | (16) | (5)or(6) |
| 18 | (1)or(2) | (10) | (7) | (12) | (5)or(6) | (15) | (8) | (13) | (5)or(6) |
| 19 | (1)or(2) | (12) | (7) | (11) | (5)or(6) | (14) | (8) | (13) | (5)or(6) |
| 20 | (1)or(2) | (12) | (7) | (11) | (5)or(6) | (14) | (8) | (16) | (1)or(2) |
| 21 | (1)or(2) | (12) | (7) | (11) | (5)or(6) | (14) | (8) | (16) | (5)or(6) |
| 22 | (1)or(2) | (12) | (7) | (11) | (5)or(6) | (16) | (8) | (14) | (1)or(2) |
| 23 | (1)or(2) | (12) | (7) | (11) | (5)or(6) | (16) | (8) | (14) | (5)or(6) |
| 24 | (1)or(2) | (12) | (7) | (11) | (5)or(6) | (16) | (8) | (15) | (5)or(6) |
| 25 | (1)or(2) | (12) | (7) | (10) | (1)or(2) | (14) | (8) | (13) | (5)or(6) |
| 26 | (1)or(2) | (12) | (7) | (10) | (1)or(2) | (14) | (8) | (16) | (1)or(2) |
| 27 | (1)or(2) | (12) | (7) | (10) | (1)or(2) | (14) | (8) | (16) | (5)or(6) |
| 28 | (1)or(2) | (12) | (7) | (10) | (1)or(2) | (16) | (8) | (14) | (1)or(2) |
| 29 | (1)or(2) | (12) | (7) | (10) | (1)or(2) | (16) | (8) | (14) | (5)or(6) |
| 30 | (1)or(2) | (12) | (7) | (10) | (1)or(2) | (16) | (8) | (15) | (5)or(6) |
| 31 | (1)or(2) | (12) | (7) | (10) | (5)or(6) | (13) | (8) | (14) | (5)or(6) |
| 32 | (1)or(2) | (12) | (7) | (10) | (5)or(6) | (13) | (8) | (14) | (1)or(2) |
| 33 | (1)or(2) | (12) | (7) | (10) | (5)or(6) | (13) | (8) | (15) | (5)or(6) |
| 34 | (1)or(2) | (12) | (7) | (10) | (5)or(6) | (15) | (8) | (13) | (5)or(6) |
| 35 | (1)or(2) | (12) | (7) | (10) | (5)or(6) | (15) | (8) | (16) | (1)or(2) |
| 36 | (1)or(2) | (12) | (7) | (10) | (5)or(6) | (15) | (8) | (16) | (5)or(6) |

FIG. 8

|    | A       | B    | C   | D    | E       | F    | G   | H    | I       |
|----|---------|------|-----|------|---------|------|-----|------|---------|
| 37 | (5)or(6)| (9)  | (7) | (11) | (5)or(6)| (14) | (8) | (13) | (5)or(6)|
| 38 | (5)or(6)| (9)  | (7) | (11) | (5)or(6)| (14) | (8) | (16) | (1)or(2)|
| 39 | (5)or(6)| (9)  | (7) | (11) | (5)or(6)| (14) | (8) | (16) | (5)or(6)|
| 40 | (5)or(6)| (9)  | (7) | (11) | (5)or(6)| (16) | (8) | (14) | (1)or(2)|
| 41 | (5)or(6)| (9)  | (7) | (11) | (5)or(6)| (16) | (8) | (14) | (5)or(6)|
| 42 | (5)or(6)| (9)  | (7) | (11) | (5)or(6)| (16) | (8) | (15) | (5)or(6)|
| 43 | (5)or(6)| (9)  | (7) | (10) | (1)or(2)| (14) | (8) | (13) | (5)or(6)|
| 44 | (5)or(6)| (9)  | (7) | (10) | (1)or(2)| (14) | (8) | (16) | (1)or(2)|
| 45 | (5)or(6)| (9)  | (7) | (10) | (1)or(2)| (14) | (8) | (16) | (5)or(6)|
| 46 | (5)or(6)| (9)  | (7) | (10) | (1)or(2)| (16) | (8) | (14) | (1)or(2)|
| 47 | (5)or(6)| (9)  | (7) | (10) | (1)or(2)| (16) | (8) | (14) | (5)or(6)|
| 48 | (5)or(6)| (9)  | (7) | (10) | (1)or(2)| (16) | (8) | (15) | (5)or(6)|
| 49 | (5)or(6)| (9)  | (7) | (10) | (5)or(6)| (13) | (8) | (14) | (5)or(6)|
| 50 | (5)or(6)| (9)  | (7) | (10) | (5)or(6)| (13) | (8) | (14) | (1)or(2)|
| 51 | (5)or(6)| (9)  | (7) | (10) | (5)or(6)| (13) | (8) | (15) | (5)or(6)|
| 52 | (5)or(6)| (9)  | (7) | (10) | (5)or(6)| (15) | (8) | (13) | (5)or(6)|
| 53 | (5)or(6)| (9)  | (7) | (10) | (5)or(6)| (15) | (8) | (16) | (1)or(2)|
| 54 | (5)or(6)| (9)  | (7) | (10) | (5)or(6)| (15) | (8) | (16) | (5)or(6)|
| 55 | (5)or(6)| (11) | (7) | (9)  | (5)or(6)| (14) | (8) | (13) | (5)or(6)|
| 56 | (5)or(6)| (11) | (7) | (9)  | (5)or(6)| (14) | (8) | (16) | (1)or(2)|
| 57 | (5)or(6)| (11) | (7) | (9)  | (5)or(6)| (14) | (8) | (16) | (5)or(6)|
| 58 | (5)or(6)| (11) | (7) | (9)  | (5)or(6)| (16) | (8) | (14) | (1)or(2)|
| 59 | (5)or(6)| (11) | (7) | (9)  | (5)or(6)| (16) | (8) | (14) | (5)or(6)|
| 60 | (5)or(6)| (11) | (7) | (9)  | (5)or(6)| (16) | (8) | (15) | (5)or(6)|
| 61 | (5)or(6)| (11) | (7) | (12) | (1)or(2)| (14) | (8) | (13) | (5)or(6)|
| 62 | (5)or(6)| (11) | (7) | (12) | (1)or(2)| (14) | (8) | (14) | (1)or(2)|
| 63 | (5)or(6)| (11) | (7) | (12) | (1)or(2)| (14) | (8) | (16) | (5)or(6)|
| 64 | (5)or(6)| (11) | (7) | (12) | (1)or(2)| (16) | (8) | (16) | (1)or(2)|
| 65 | (5)or(6)| (11) | (7) | (12) | (1)or(2)| (16) | (8) | (14) | (5)or(6)|
| 66 | (5)or(6)| (11) | (7) | (12) | (1)or(2)| (16) | (8) | (15) | (5)or(6)|
| 67 | (5)or(6)| (11) | (7) | (12) | (5)or(6)| (13) | (8) | (14) | (5)or(6)|
| 68 | (5)or(6)| (11) | (7) | (12) | (5)or(6)| (13) | (8) | (14) | (1)or(2)|
| 69 | (5)or(6)| (11) | (7) | (12) | (5)or(6)| (13) | (8) | (15) | (5)or(6)|
| 70 | (5)or(6)| (11) | (7) | (12) | (5)or(6)| (15) | (8) | (13) | (5)or(6)|
| 71 | (5)or(6)| (11) | (7) | (12) | (5)or(6)| (15) | (8) | (16) | (1)or(2)|
| 72 | (5)or(6)| (11) | (7) | (12) | (5)or(6)| (15) | (8) | (16) | (5)or(6)|

FIG. 9

|     | A   | B    | C   | D    | E   | F    | G   | H    | I   |
| --- | --- | ---- | --- | ---- | --- | ---- | --- | ---- | --- |
| 73  | (3) | (10) | (7) | (9)  | (4) | (13) | (8) | (14) | (3) |
| 74  | (3) | (10) | (7) | (9)  | (4) | (13) | (8) | (16) | (4) |
| 75  | (3) | (10) | (7) | (9)  | (4) | (16) | (8) | (13) | (4) |
| 76  | (3) | (10) | (7) | (9)  | (4) | (16) | (8) | (15) | (3) |
| 77  | (3) | (10) | (7) | (11) | (3) | (14) | (8) | (13) | (4) |
| 78  | (3) | (10) | (7) | (11) | (3) | (14) | (8) | (15) | (3) |
| 79  | (3) | (10) | (7) | (11) | (3) | (15) | (8) | (14) | (3) |
| 80  | (3) | (10) | (7) | (11) | (3) | (15) | (8) | (16) | (4) |
| 81  | (3) | (11) | (7) | (10) | (3) | (14) | (8) | (13) | (4) |
| 82  | (3) | (11) | (7) | (10) | (3) | (14) | (8) | (15) | (3) |
| 83  | (3) | (11) | (7) | (10) | (3) | (15) | (8) | (14) | (3) |
| 84  | (3) | (11) | (7) | (10) | (3) | (15) | (8) | (16) | (4) |
| 85  | (3) | (11) | (7) | (12) | (4) | (13) | (8) | (14) | (3) |
| 86  | (3) | (11) | (7) | (12) | (4) | (13) | (8) | (16) | (4) |
| 87  | (3) | (11) | (7) | (12) | (4) | (16) | (8) | (13) | (4) |
| 88  | (3) | (11) | (7) | (12) | (4) | (16) | (8) | (15) | (3) |
| 89  | (4) | (9)  | (7) | (10) | (3) | (14) | (8) | (13) | (4) |
| 90  | (4) | (9)  | (7) | (10) | (3) | (14) | (8) | (15) | (3) |
| 91  | (4) | (9)  | (7) | (10) | (3) | (15) | (8) | (14) | (3) |
| 92  | (4) | (9)  | (7) | (10) | (3) | (15) | (8) | (16) | (4) |
| 93  | (4) | (9)  | (7) | (12) | (4) | (13) | (8) | (14) | (3) |
| 94  | (4) | (9)  | (7) | (12) | (4) | (13) | (8) | (16) | (4) |
| 95  | (4) | (9)  | (7) | (12) | (4) | (16) | (8) | (13) | (4) |
| 96  | (4) | (9)  | (7) | (12) | (4) | (16) | (8) | (15) | (3) |
| 97  | (4) | (12) | (7) | (9)  | (4) | (13) | (8) | (14) | (3) |
| 98  | (4) | (12) | (7) | (9)  | (4) | (13) | (8) | (16) | (4) |
| 99  | (4) | (12) | (7) | (9)  | (4) | (16) | (8) | (13) | (4) |
| 100 | (4) | (12) | (7) | (9)  | (4) | (16) | (8) | (15) | (3) |
| 101 | (4) | (12) | (7) | (11) | (3) | (14) | (8) | (13) | (4) |
| 102 | (4) | (12) | (7) | (11) | (3) | (14) | (8) | (15) | (3) |
| 103 | (4) | (12) | (7) | (11) | (3) | (15) | (8) | (14) | (3) |
| 104 | (4) | (12) | (7) | (11) | (3) | (15) | (8) | (16) | (4) |

DC-DC CONVERTER

CROSS-REFERENCE TO RELATED APPLICATIONS

The present application is a continuation of PCT/JP2016/071485 filed Jul. 22, 2016, which claims priority to Japanese Patent Application No. 2015-169417, filed Aug. 28, 2015, the entire contents of each of which are incorporated herein by reference.

TECHNICAL FIELD

The present disclosure relates to a dual active bridge (DAB) direct current-to-direct current (DC-DC) converter.

BACKGROUND

Patent Document 1 (identified below) discloses an existing DAB converter. In the DAB converter described in Patent Document 1, a full-bridge circuit is connected to each of a primary winding and a secondary winding of a transformer and the switching phase difference between the two full-bridge circuits is appropriately controlled to perform transfer of power.

Patent Document 1: U.S. Pat. No. 5,355,294.

With the converter described in Patent Document 1, switching loss can be reduced by performing zero voltage switching (ZVS) using leakage inductance from the transformer and parasitic capacitance of a semiconductor device. However, since the ZVS range is restricted and reactive current is increased in proportion to the difference between an input-output voltage ratio and the turn ratio of the transformer, efficiency may be reduced when performing the ZVS. For example, when the input-output voltage ratio is high and a load connected to an output terminal is lightly loaded, the reactive current that does not contribute to transmitted power may be increased to degrade the efficiency.

SUMMARY OF THE INVENTION

Accordingly, a DC-DC converter is disclosed herein that is capable of performing a ZVS operation over a wide range and constantly operating with high efficiency even when the input-output voltage ratio is high and the variation range of the load is wide.

According to an exemplary embodiment, a DC-DC converter disclosed herein includes an input unit through which direct-current voltage V1 is input; an output unit through which direct-current voltage V2 is output; a first full-bridge circuit connected to the input unit; a second full-bridge circuit connected to the output unit; and a transformer that has a first winding and a second winding that are magnetically coupled to each other. Moreover, the first winding is connected to the first full-bridge circuit, the second winding is connected to the second full-bridge circuit; and a control unit performs switching control of the first full-bridge circuit. In the exemplary aspect, the first full-bridge circuit includes a first series circuit in which first through fourth switching elements are sequentially connected in series to each other; and a second series circuit which is connected in parallel to the first series circuit and in which a fifth through eighth switching elements are sequentially connected in series to each other. Furthermore, a first floating capacitor is connected to a node between the first switching element and the second switching element and a node between the third switching element and the fourth switching element; and a second floating capacitor is connected to a node between the fifth switching element and the sixth switching element and a node between the seventh switching element and the eighth switching element. One end of the first winding of the transformer is connected to a node between the second switching element and the third switching element and the other end of the first winding of the transformer is connected to a node between the sixth switching element and the seventh switching element. The control unit performs the switching control of the first full-bridge circuit in at least two modes of a full-bridge operation mode in which the first to eighth switching elements are controlled so that voltage to be applied to both ends of the first winding of the transformer is the direct-current voltage V1 and a half-bridge operation mode in which the first to eighth switching elements are controlled so that the voltage to be applied to both ends of the first winding of the transformer is half of the direct-current voltage V1.

With the above configuration, it is possible to make the voltage output from the first full-bridge circuit, when the voltage input through the input unit is applied to the floating capacitor, different from the voltage output from the first full-bridge circuit when the voltage input through the input unit is not applied to the floating capacitor. In other words, operating the first full-bridge circuit in the full-bridge operation mode or in the half-bridge operation mode enables an increase in reactive current that does not contribute to transmitted power to be suppressed to cause the DC-DC converter to efficiently operate by making the ZVS range wider than that of the configuration in related art even when the input-output voltage ratio is high and the variation range of a load connected to the output unit is wide.

In addition, since the four switching elements are connected in series to each other in each of the first series circuit and the second series circuit composing the first full-bridge circuit, the voltage applied to each element is lower than that in the case in which the two switching elements are connected in series to each other. Accordingly, it is not necessary to make the element breakdown voltage of each switching element high. As a result, a metal oxide semiconductor field effect transistor (MOSFET) having a low on-resistance value is capable of being used for each switching element.

In an exemplary aspect, the control unit may output voltage of five levels from the first full-bridge circuit by switching between the full-bridge operation mode and the half-bridge operation mode during one period of a driving frequency of the first full-bridge circuit.

With this configuration, since the voltage of five levels is capable of being output, it is possible to cause the DC-DC converter to perform the ZVS operation even in an area that is lightly loaded. Accordingly, it is possible to provide the DC-DC converter capable of further efficiently operating when the input-output voltage ratio is high and the variation range of a load connected to the output unit is wide.

In another exemplary aspect, it is preferred that the input unit be a first input-output unit through which direct-current voltage is input and output, and that the output unit be a second input-output unit through which direct-current voltage is input and output and the voltage input through the first input-output unit be higher than the voltage input through the second input-output unit.

With this configuration, it is possible to transform the input voltage through the first input-output unit over a wide range.

In yet another exemplary aspect, the DC-DC converter disclosed herein preferably further includes a load current detection unit that detects current flowing through a load connected to the output unit. The control unit preferably switches between the full-bridge operation mode and the half-bridge operation mode based on a result detected by the load current detection unit.

With this configuration, the detection of load current enables determination of whether the load is lightly loaded or heavily loaded and appropriate switching between the full-bridge operation mode and the half-bridge operation mode in accordance with the result of the determination enables the switching control to be performed with high efficiency in a wide load area.

According to the exemplary embodiments, since switching of the operation mode enables the range of the ZVS operation to be widened even when the input-output voltage ratio is high and the load connected to the output unit is widely varied, it is possible to suppress an increase in the reactive current that does not contribute to transmitted power to cause the DC-DC converter to efficiently operate.

BRIEF DESCRIPTION OF DRAWINGS

FIG. 2 is a table illustrating the relationship between the states of eight switching elements in a full-bridge circuit and voltages.

FIG. 7 is a table illustrating transition patterns during "one switch period" of the operation modes illustrated in FIG. 2 in a five-level operation mode.

FIG. 8 is a table illustrating transition patterns during "one switch period" of the operation modes illustrated in FIG. 2 in the five-level operation mode.

FIG. 9 is a table illustrating transition patterns during "one switch period" of the operation modes illustrated in FIG. 2 in the five-level operation mode.

DETAILED DESCRIPTION OF EXEMPLARY EMBODIMENTS

An exemplary DC-DC converter described below is a DAB DC-DC converter including two full-bridge circuits. In the DAB DC-DC converter, the two full-bridge circuits are set so as to have the same driving frequency and are controlled so as to have a phase difference to transmit electric power between the two full-bridge circuits.

Figure 1:
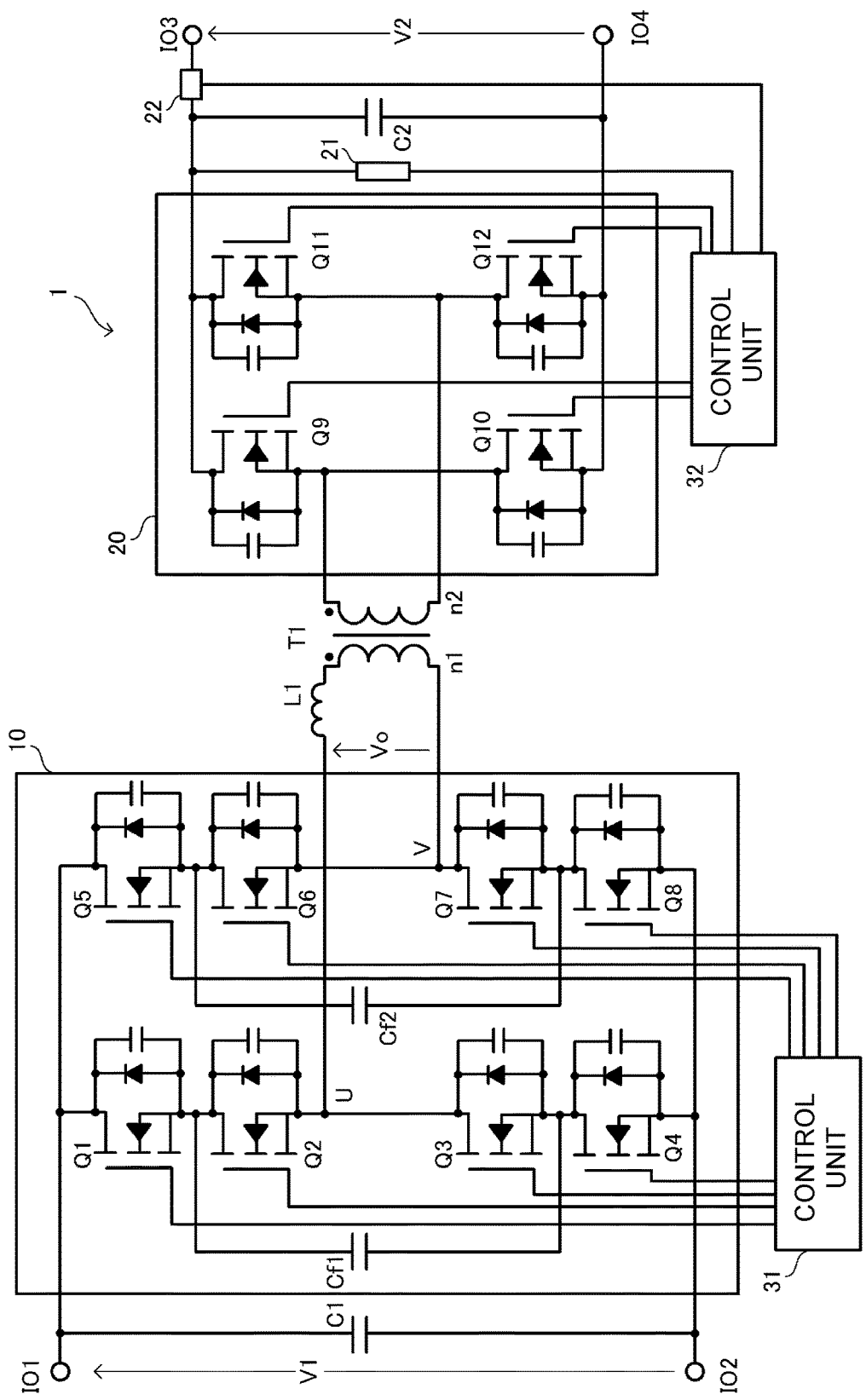
FIG. 1 is a circuit diagram of a DC-DC converter according to an exemplary embodiment.

FIG. 1 is a circuit diagram of a DC-DC converter 1 according to an exemplary embodiment.

As shown, the DC-DC converter 1 has input-output terminals IO1, IO2, IO3, and IO4. A load and a direct-current power supply are connected to the input-output terminals IO1, IO2, IO3, and IO4. The DC-DC converter 1 is a bi-directional DC-DC converter that transforms direct-current voltage supplied from the input-output terminals IO1 and IO2 or the input-output terminals IO3 and IO4 and outputs the transformed voltage from the remaining input-output terminals.

For purposes to the disclosure, the input-output terminals IO1 and IO2 correspond to an "input unit" and/or a "first input-output unit" according to the exemplary embodiment. Moreover, the input-output terminals IO3 and IO4 correspond to an "output unit" and a "second input-output unit" according to the exemplary embodiment.

An input capacitor C1 and a full-bridge circuit 10 are connected to the input-output terminals IO1 and IO2. The full-bridge circuit 10 has a configuration in which a first series circuit composed of a first switching element Q1, a second switching element Q2, a third switching element Q3, and a fourth switching element Q4 is connected in parallel to a second series circuit composed of a fifth switching element Q5, a sixth switching element Q6, a seventh switching element Q7, and an eighth switching element Q8.

According to the exemplary aspect, each of the first to eighth switching elements Q1 to Q8 can be an n-type MOSFET having a body diode and parasitic capacitance formed therein. The gate of each of the first to eighth switching elements Q1 to Q8 is connected to a control unit 31 (i.e., a "controller"). The first to eighth switching elements Q1 to Q8 are subjected to switching control in response to gate voltage applied from the control unit 31. The first to eighth switching elements Q1 to Q8 are hereinafter simply referred to as the switching elements Q1 to Q8. In general, the control unit 31 (as well as control unit 32) can include any type of processor, microprocessor, microcontroller, or the like, that is configured to activate and deactivate the switching elements Q1 to Q8 in order to perform the algorithms described herein for performing the switching control as would be appreciated to one skilled in the art. For example, the control unit 31 can include real-world devices, components, or arrangement of components implemented using hardware, such as by an application specific integrated circuit or field-programmable gate array, for example, or as a combination of hardware and software, such as by a microprocessor system and a set of instructions to execute the switching control according to the exemplary aspect.

Moreover, a typical full-bridge circuit in the related art generally has a configuration in which series circuits each including two switching elements that are connected in series to each other are connected in parallel to each other. In contrast, in the present embodiment, since the four switching elements are connected in series to each other in each of the first series circuit and the second series circuit composing the full-bridge circuit 10, the voltage applied to each element is lower than that in the full-bridge circuit in the related art in which the two switching elements are connected in series to each other. Accordingly, it is not necessary to make the element breakdown voltage of each switching element high. Since the switching element having a high breakdown voltage generally has a high on-resistance value, a MOSFET having a low on-resistance value is capable of being used for each switching element.

In addition, the full-bridge circuit 10 also includes a first charge-discharge capacitor Cf1 and a second charge-discharge capacitor Cf2. The first charge-discharge capacitor Cf1 is connected between a node between the first switching element Q1 and the second switching element Q2 and a node between the third switching element Q3 and the fourth switching element Q4. The second charge-discharge capacitor Cf2 is connected between a node between the fifth switching element Q5 and the sixth switching element Q6 and a node between the seventh switching element Q7 and the eighth switching element Q8.

For purposes of the disclosure, the full-bridge circuit 10 corresponds to a "first full-bridge circuit" according to the exemplary embodiment. Moreover, the first charge-discharge capacitor Cf1 corresponds to a "first floating capacitor" and the second charge-discharge capacitor Cf2 corresponds to a "second floating capacitor" according to the exemplary embodiment.

As further shown, an input capacitor C2 and a full-bridge circuit 20 are connected to the input-output terminals IO3 and IO4. The full-bridge circuit 20 has a configuration in which a ninth switching element Q9 and a tenth switching element Q10, which are connected in series to each other, are connected in parallel to an eleventh switching element Q11 and a twelfth switching element Q12, which are connected in series to each other. Moreover, each of the ninth to twelfth switching elements Q9 to Q12 can be an n-type MOSFET having a body diode and parasitic capacitance formed therein according to the exemplary aspect. The gate of each of the ninth to twelfth switching elements Q9 to Q12 is connected to a control unit 32. The ninth to twelfth switching elements Q9 to Q12 are subjected to the switching control in response to a gate signal applied from the control unit 32. The full-bridge circuit 20 corresponds to a "second full-bridge circuit" according to the exemplary embodiment.

In addition, an output voltage detection circuit 21 and a load current detection circuit 22 are provided for the input-output terminals IO3 and IO4. An overvoltage protection function and an overcurrent protection function can be added and load current can be detected to determine whether the load is lightly loaded or heavily loaded. For purposes of the disclosure, the load current detection circuit 22 can be an example of a "load current detection unit" according to the exemplary embodiment.

A transformer T1 is connected between the full-bridge circuit 10 and the full-bridge circuit 20. The transformer T1 has a primary winding n1 and a secondary winding n2. One end of the primary winding n1 is connected to a node U between the second switching element Q2 and the third switching element Q3 with a resonant coil L1 disposed therebetween and the other end of the primary winding n1 is connected to a node V between the sixth switching element Q6 and the seventh switching element Q7. One end of the secondary winding n2 is connected to a node between the ninth switching element Q9 and the tenth switching element Q10 and the other end of the secondary winding n2 is connected to a node between the eleventh switching element Q11 and the twelfth switching element Q12. The turn ratio between the primary winding n1 and the secondary winding n2 is set to N:1 in the present embodiment.

For purposes of the disclosure, the primary winding n1 of the transformer T1 corresponds to a "first winding" and the secondary winding n2 thereof corresponds to a "second winding" according to the exemplary embodiment. Although the full-bridge circuit 10 side of the transformer T1 is the primary winding and the full-bridge circuit 20 side thereof is the secondary winding in the transformer T1 according to the present embodiment, the full-bridge circuit 10 side of the transformer T1 may be the secondary winding and the full-bridge circuit 20 side thereof may be the primary winding.

In the exemplary DC-DC converter 1 having the above configuration, the control unit 31 controls the full-bridge circuit 10 through zero voltage switching using the resonance of the parasitic capacitance of each of the switching elements Q1 to Q8 with the resonant coil L1. Specifically, during a dead time period in switching of turning-on and turning-off of each switching element, the current flowing through the resonant coil L1 is caused to flow through the parasitic capacitance of the switching element to discharge the parasitic capacitance and the switching element is turned on at zero voltage. This effectively reduces switching loss, switching noise, and so on. The zero voltage switching may be performed using the resonance of the leakage inductance of the transformer T1 with the parasitic capacitance of each of the switching elements Q1 to Q8 without using the resonant coil L1.

Direct-current voltage V1 is applied to the input-output terminals IO1 and IO2 of the DC-DC converter 1 having the above configuration. The control unit 31 performs the switching control of each of the switching elements Q1 to Q8 in the full-bridge circuit 10. Voltage Vo of five levels: 0, ±V1/2, and ±V1 is applied to the primary winding n1 of the transformer T1. Upon application of the voltage Vo to the primary winding n1, voltage is induced at the secondary winding n2. Moreover, the control unit 32 performs the switching control of the full-bridge circuit 20 to output direct-current voltage V2 of 0, V1/2N, and V1/N from the input-output terminals IO3 and IO4. In other words, the full-bridge circuit 10 is a five-level circuit that outputs the five voltage levels. The DC-DC converter 1 is a three-level DC-DC converter that outputs the three voltage levels.

Since the DC-DC converter 1 is a bi-directional DC-DC converter, the DC-DC converter 1 performs the switching control of the full-bridge circuits 10 and 20 to output direct-current voltage from the input-output terminals IO1 and IO2 when the direct-current voltage is input through the input-output terminals IO3 and IO4.

FIG. 2 is a table illustrating the relationship between the states of the eight switching elements in the full-bridge circuit 10 and voltage Vu, voltage Vv, and the voltage Vo and the relative relationship between the charge-discharge states of the first charge-discharge capacitor Cf1 and the second charge-discharge capacitor Cf2 for each operation mode. The voltage Vu is the voltage at the node U between the switching elements Q2 and Q3. The voltage Vv is the voltage at the node V between the switching elements Q6 and Q7. The voltage Vo is output voltage from the full-bridge circuit 10, which is applied to the primary winding n1 of the transformer T1, and is the difference in voltage between the node U and the node V. FIG. 3(A), FIG. 3(B), FIG. 3(C), FIG. 3(D), FIG. 4(A), FIG. 4(B), FIG. 4(C), FIG. 4(D), FIG. 5(A), FIG. 5(B), FIG. 5(C), FIG. 5(D), FIG. 6(A), FIG. 6(B), FIG. 6(C), and FIG. 6(D) are equivalent circuit diagrams of the full-bridge circuit 10 in the respective states illustrated in FIG. 2.

The full-bridge circuit 10 according to the present embodiment operates in any of a full-bridge operation mode, a half-bridge operation mode, and a five-level operation mode. The full-bridge operation mode is an operation mode in which the voltage Vo=±V1. In this full-bridge operation mode, the current path does not pass through the first charge-discharge capacitor Cf1 and the second charge-discharge capacitor Cf2. The half-bridge operation mode is an operation mode in which the voltage Vo=±V1/2. In this half-bridge operation mode, the current path passes through only one of the first charge-discharge Cf1 capacitor and the second charge-discharge capacitor Cf2. The five-level operation mode is an operation mode resulting from combination of the full-bridge operation mode and the half-bridge operation mode, in which the voltage Vo=0, ±V1/2, and ±V1.

(Vo=V1)

Figure 3A:
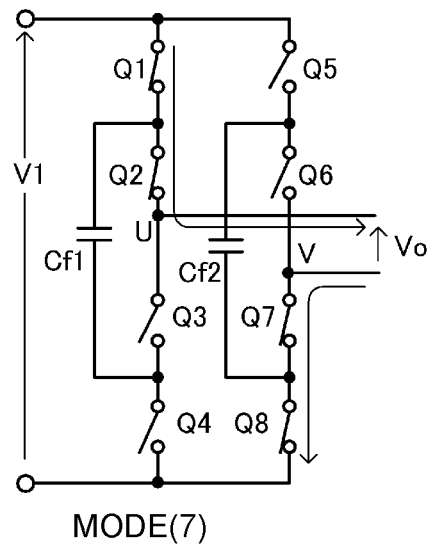
FIG. 3(A), FIG. 3(B), FIG. 3(C), and FIG. 3(D) are equivalent circuit diagrams of the full-bridge circuit in the states illustrated in FIG. 2.

In a state in which the switching elements Q1, Q2, Q7, and Q8 are turned on and the switching elements Q3, Q4, Q5, and Q6 are turned off, the current flows through a path illustrated in FIG. 3(A). The voltage Vo in this case is V1. In this case, the voltage Vu=V1, the voltage Vv=0, and the voltage Vo=Vu−Vv=V1.

(Vo=−V1)

Figure 3B:
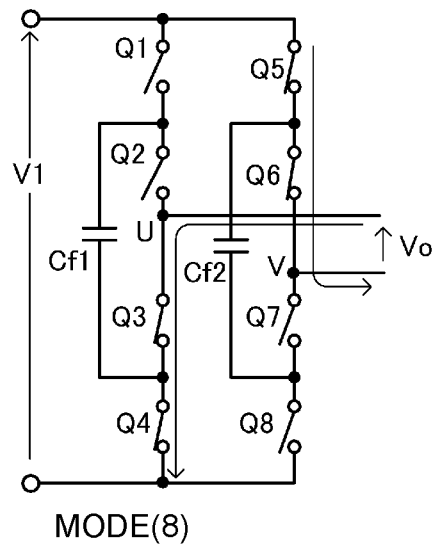

In a state in which the switching elements Q3, Q4, Q5, and Q6 are turned on and the switching elements Q1, Q2, Q7, and Q8 are turned off, the current flows through a path illustrated in FIG. 3(B). In this case, the voltage having a polarity opposite to that in FIG. 3(A) is applied to the primary winding n1 of the transformer T1 and the voltage Vu=0, the voltage Vv=V1, and the voltage Vo=Vu−Vv=−V1.

(Vo=0)

Figure 3C:
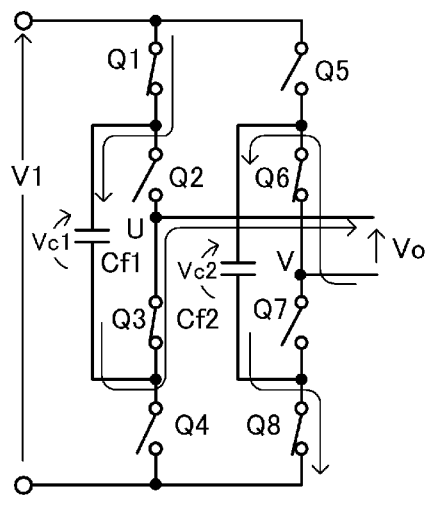

In a state in which the switching elements Q1, Q3, Q6, and Q8 are turned on and the switching elements Q2, Q4, Q5, and Q7 are turned off, the current flows through a path illustrated in FIG. 3(C). In this case, the voltage Vu=V1−Vc1. Vc1 denotes charge voltage of the first charge-discharge capacitor Cf1. When Vc1=V1/2, the voltage Vu=V1/2. The voltage Vv=Vc2. Vc2 denotes charge voltage of the second charge-discharge capacitor Cf2. When Vc2=V1/2, the voltage Vv=V1/2. The voltage Vo=Vu−Vv=0.

Figure 3D:
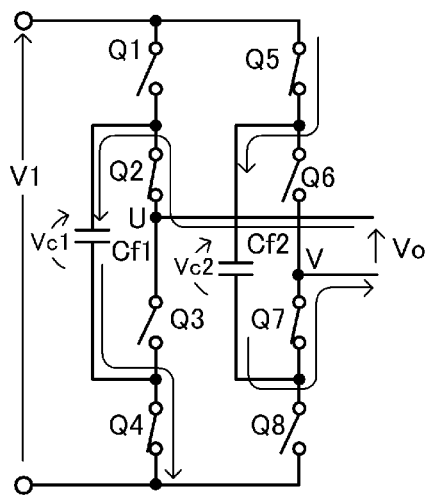

In addition, in a state in which the switching elements Q2, Q4, Q5, and Q7 are turned on and the switching elements Q1, Q3, Q6, and Q8 are turned off, the current flows through a path illustrated in FIG. 3(D). In this case, the voltage Vu=V1−Vc1=V1/2, the voltage Vv=V1−Vc2=V1/2, and the voltage Vo=Vu-Vv=0.

Figure 4A:
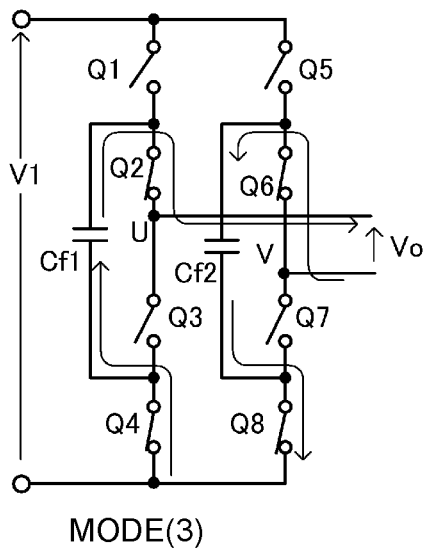
FIG. 4(A), FIG. 4(B), FIG. 4(C), and FIG. 4(D) are equivalent circuit diagrams of the full-bridge circuit in the states illustrated in FIG. 2.
Figure 4B:
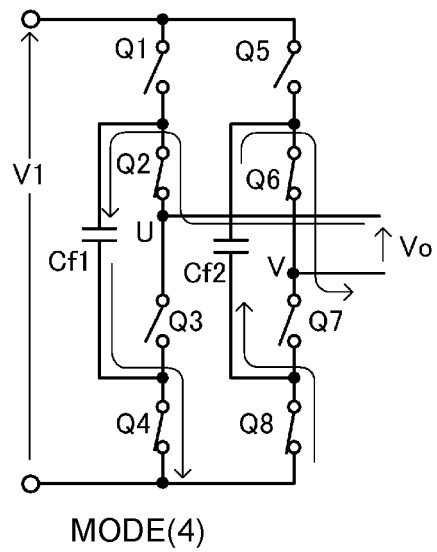

Furthermore, in a state in which the switching elements Q2, Q4, Q6, and Q8 are turned on and the switching elements Q1, Q3, Q5, and Q7 are turned off, the current flows through paths illustrated in FIG. 4(A) and FIG. 4(B). Although the voltage Vo=0 also in this case, the direction in which the current flows in FIG. 4(A) is opposite to that in FIG. 4(B). The direction is varied depending on the relative charge-discharges state of the first charge-discharge capacitor Cf1 and the second charge-discharge capacitor Cf2.

Figure 4C:
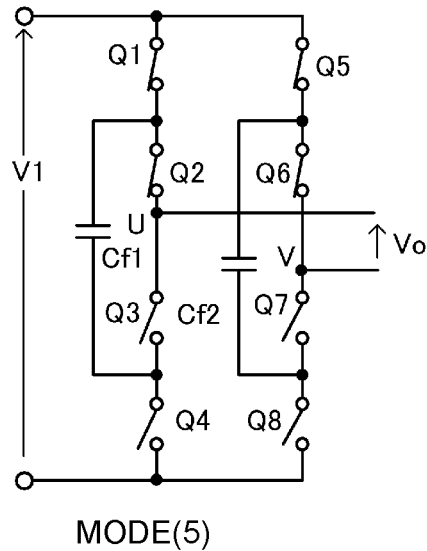
Figure 4D:
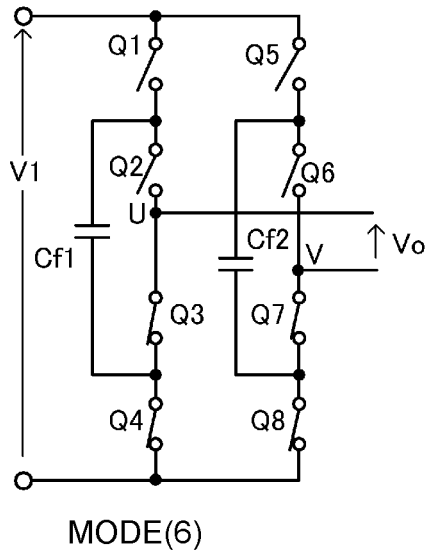

Furthermore, also in a state in which the switching elements Q1, Q2, Q5, and Q6 are turned on and the switching elements Q3, Q4, Q7, and Q8 are turned off, the voltage Vo=0, as illustrated in FIG. 4(C). Also in a state in which the switching elements Q3, Q4, Q7, and Q8 are turned on and the switching elements Q1, Q2, Q5, and Q6 are turned off, the voltage Vo=0, as illustrated in FIG. 4(D).

(Vo=V1/2)

Figure 5A:
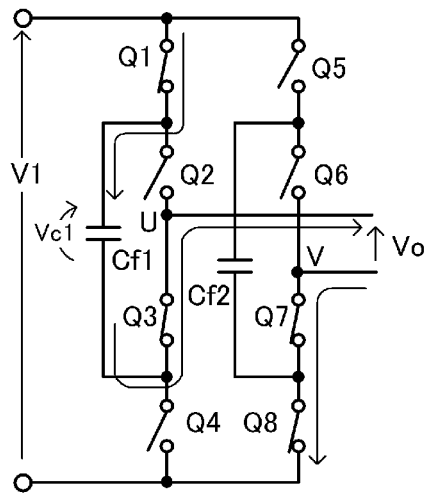
FIG. 5(A), FIG. 5(B), FIG. 5(C), and FIG. 5(D) are equivalent circuit diagrams of the full-bridge circuit in the states illustrated in FIG. 2.
Figure 5B:
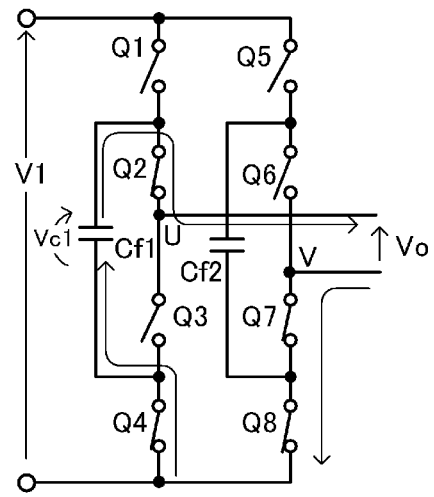

In a state in which the switching elements Q1, Q3, Q7, and Q8 are turned on and the switching elements Q2, Q4, Q5, and Q6 are turned off, the current flows through a path illustrated in FIG. 5(A). In this case, the voltage Vu=V1−Vc1=V1/2, the voltage Vv=0, and the voltage Vo=Vu−Vv=V1/2. In addition, in a state in which the switching elements Q2, Q4, Q7, and Q8 are turned on and the switching elements Q1, Q3, Q5, and Q6 are turned off, the current flows through a path illustrated in FIG. 5(B). In this case, the voltage Vu=Vc1=V1/2, the voltage Vv=0, and the voltage Vo=Vu−Vv=V1/2. The voltage Vu is the voltage Vc1 with which the first charge-discharge capacitor Cf1 is charged in the state in FIG. 5(A).

Figure 5C:
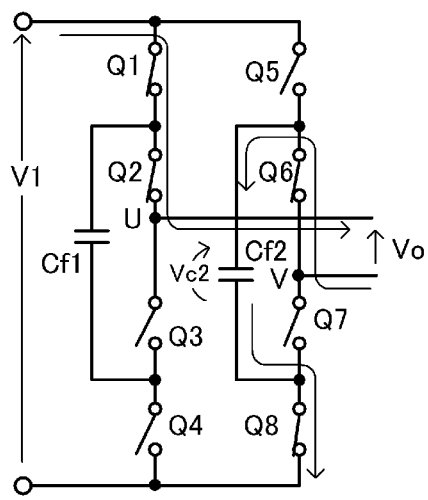
Figure 5D:
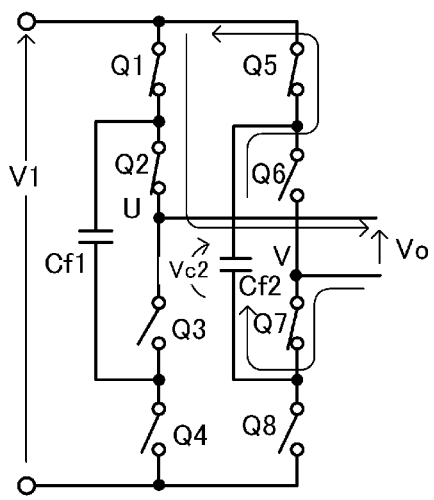

Furthermore, in a state in which the switching elements Q1, Q2, Q6, and Q8 are turned on and the switching elements Q3, Q4, Q5, and Q7 are turned off, the current flows through a path illustrated in FIG. 5(C). Furthermore, in a state in which the switching elements Q1, Q2, Q5, and Q7 are turned on and the switching elements Q3, Q4, Q6, and Q8 are turned off, the current flows through a path illustrated in FIG. 5(D) and the voltage Vo=V1/2. The voltage Vu is the voltage Vc2 with which the first charge-discharge capacitor Cf2 is charged in the state in FIG. 5(C).

(Vo=−V1/2)

Figure 6A:
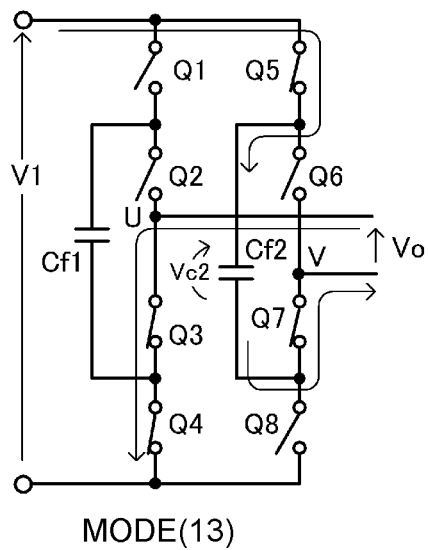
FIG. 6(A), FIG. 6(B), FIG. 6(C), and FIG. 6(D) are equivalent circuit diagrams of the full-bridge circuit in the states illustrated in FIG. 2.
Figure 6B:
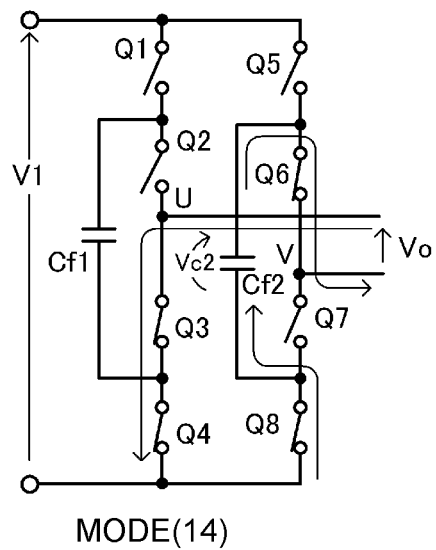

In a state in which the switching elements Q3, Q4, Q5, and Q7 are turned on and the switching elements Q1, Q2, Q6, and Q8 are turned off, the current flows through a path illustrated in FIG. 6(A). In this case, the voltage Vu=0, the voltage Vv=V1−Vc2=V1/2, and the voltage Vo=Vu−Vv=−V1/2. In addition, in a state in which the switching elements Q3, Q4, Q6, and Q8 are turned on and the switching elements Q1, Q2, Q5, and Q7 are turned off, the current flows through a path illustrated in FIG. 6(B). In this case, the voltage Vu=0, the voltage Vv=Vc2=V1/2, and the voltage Vo=Vu−Vv=−V1/2. The voltage Vv is the voltage Vc2 with which the second charge-discharge capacitor Cf2 is charged in the state in FIG. 6(A).

Figure 6C:
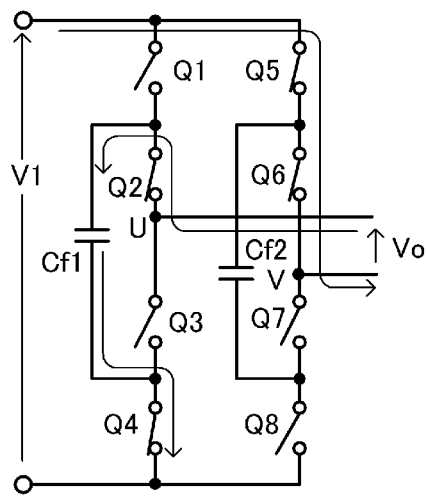
Figure 6D:
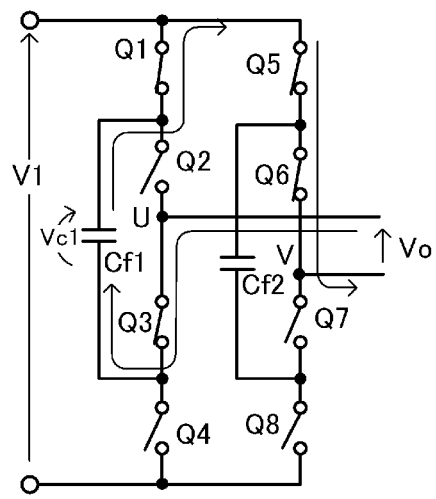

Furthermore, in a state in which the switching elements Q2, Q4, Q5, and Q6 are turned on and the switching elements Q1, Q3, Q7, and Q8 are turned off, the current flows through a path illustrated in FIG. 6(C) and the voltage Vo=−V1/2. Furthermore, in a state in which the switching elements Q1, Q3, Q5, and Q6 are turned on and the switching elements Q2, Q4, Q7, and Q8 are turned off, the current flows through a path illustrated in FIG. 6(D) and the voltage Vo=−V1/2. The voltage Vv is the voltage Vc1 with which the second charge-discharge capacitor Cf1 is charged in the state in FIG. 6(C).

As described above, the full-bridge circuit 10 operates in any of the full-bridge operation mode, the half-bridge operation mode, and the five-level operation mode. In the five-level operation mode, the output period of the five voltage levels is determined by the period in which the voltage Vu=V1/2 and the phase difference between the voltage Vu and the voltage Vv.

When the full-bridge circuit 10 operates in the five-level operation mode, the voltage Vo makes the transition among 0→V1/2→V1→V1/2→0→−V1/2→−V1→−V1/2→0 during one switching period. Examples of combination meeting the above conditions, among the 16 modes illustrated in FIG. 2, are illustrated in FIG. 7, FIG. 8, and FIG. 9. More particularly, FIG. 7, FIG. 8, and FIG. 9 are tables illustrating transition patterns during "one switching period" of the operation modes illustrated in FIG. 2 in the five-level operation mode. The "one switching period" means one period of the driving frequency of the first full-bridge circuit in the five-level operation mode, that is, the driving period of the transformer T1. For example, the "one switching period" means the range from "t1" to "t2", taking FIG. 10 as an example. For purposes of the disclosure, the "one switching period" corresponds to "one period of a driving frequency of the first full-bridge circuit" of the exemplary embodiment.

Figure 10:
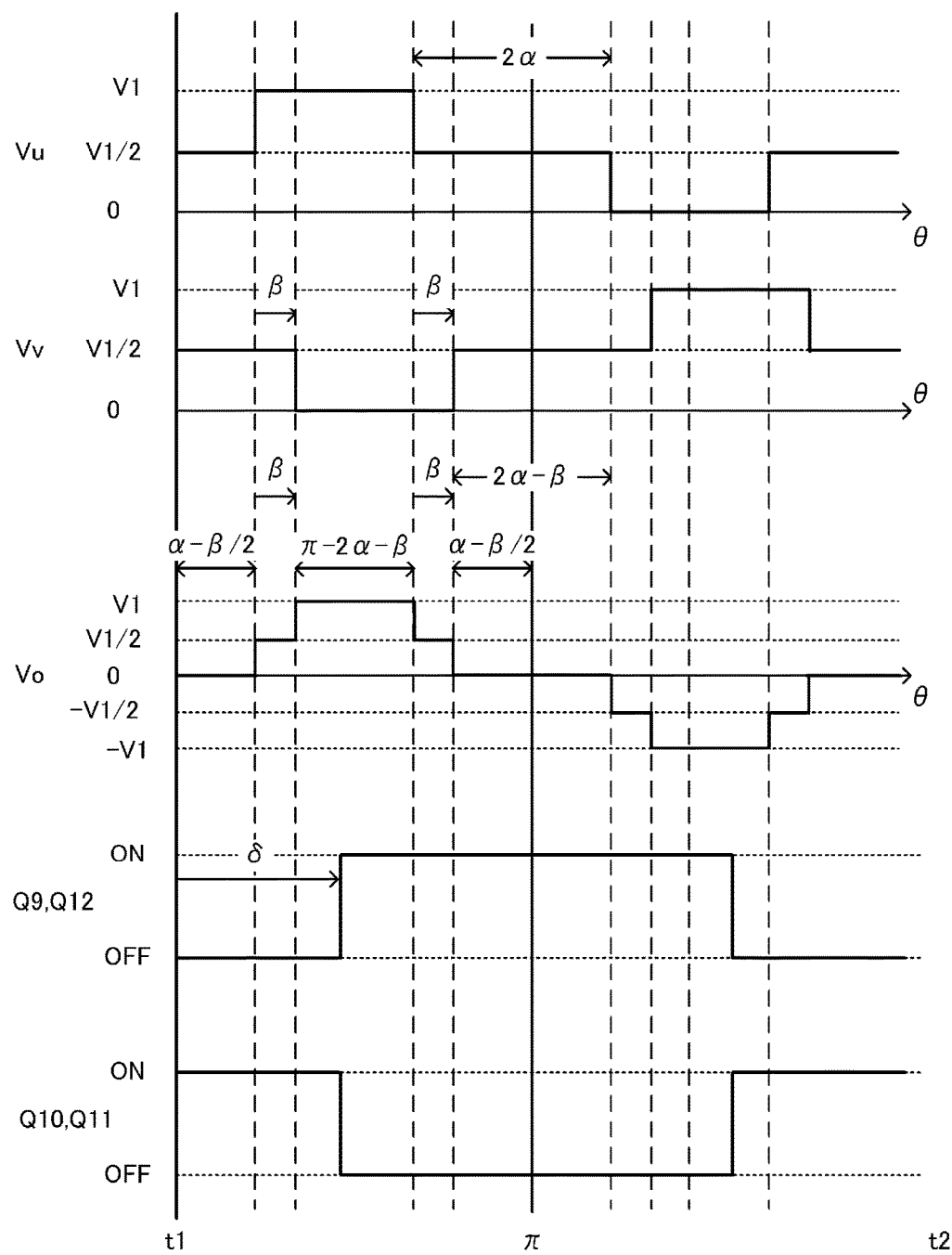
FIG. 10 is a diagram illustrating voltage waveforms of the voltages at each position of the full-bridge circuit.

FIG. 10 is a diagram illustrating voltage waveforms of the voltage Vu, the voltage Vv, and the voltage Vo at each position of the full-bridge circuit 10.

Referring to FIG. 10, 2a is a period in which the voltage Vu=V1/2 during a half period π. In addition, β is the phase difference between the voltage Vu and the voltage Vv. The period in which the voltage Vo=0 is 2α-β, the period in which the voltage Vo=V1/2 is 2β, and the period in which the voltage Vo=V1 is π-2α-β. The output period of each of the five voltage levels is adjusted based on the values of α and β.

The switching timing of the switching elements Q9 to Q12 in the full-bridge circuit 20 is also illustrated in FIG. 10. The control unit 32 turns on and off the switching elements Q9 and Q12 and the switching elements Q10 and Q11 with a duty ratio of 50%. δ is the switching phase difference between the full-bridge circuits 10 and 20. The output voltage from the DC-DC converter 1 is controlled based on α, β, and δ.

Figure 11:
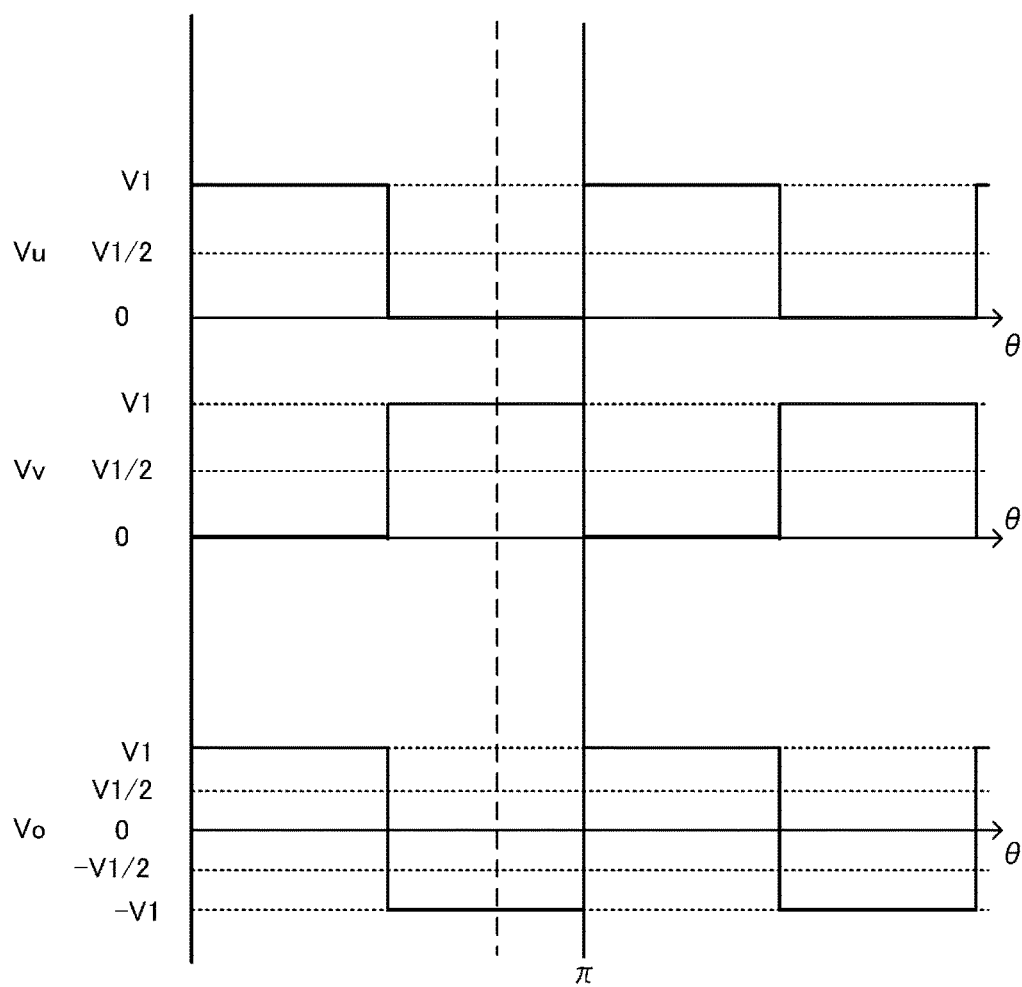
FIG. 11 is a diagram illustrating the voltage waveforms of the voltages at each position of the full-bridge circuit when α, β=0.

When the full-bridge circuit 10 is subjected to the switching control so that α, β=0, the voltage Vo=±V1. FIG. 11 is a diagram illustrating the voltage waveforms of the voltage Vu, the voltage Vv, and the voltage Vo at each position of the full-bridge circuit 10 when α, β=0. The full-bridge circuit 10 operates in the full-bridge operation mode in the manner illustrated in FIG. 11.

Figure 12:
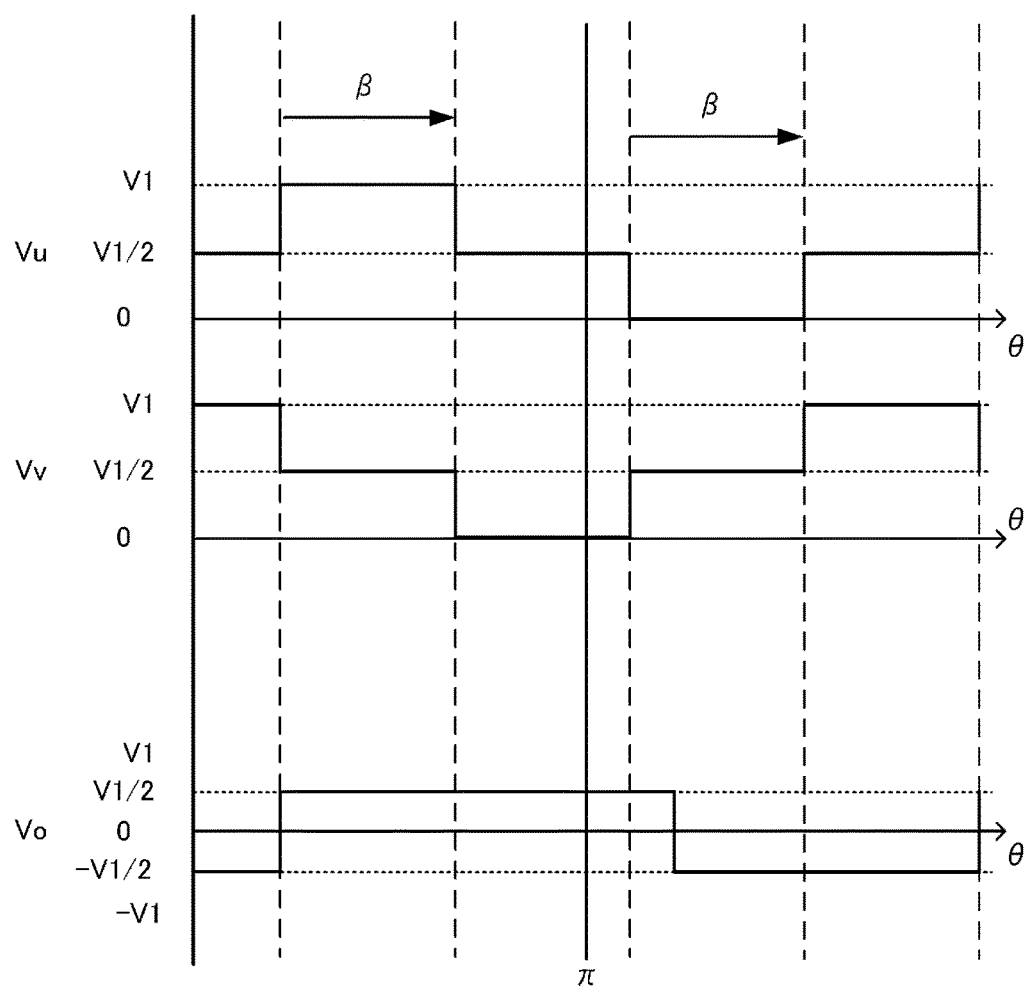
FIG. 12 is a diagram illustrating the voltage waveforms of the voltages at each position of the full-bridge circuit when α=π/4 and β=π/2.

When the full-bridge circuit 10 is subjected to the switching control so that α=π/4 and β=π/2, the voltage Vo=±V1/2. FIG. 12 is a diagram illustrating the voltage waveforms of the voltage Vu, the voltage Vv, and the voltage Vo at each position of the full-bridge circuit 10 when α=π/4 and β=π/2. The full-bridge circuit 10 operates in the half-bridge operation mode in the manner illustrated in FIG. 12.

Since the DC-DC converter 1 according to the present embodiment outputs the three voltage levels, it is possible to operate the DC-DC converter 1 with high efficiency in accordance with the load variation of the load connected to the DC-DC converter 1. In general, for a two-level insulating DC-DC converter, the ZVS range is restricted by the input-output voltage ratio and the turn ratio of the transformer. Accordingly, since the operation range of the DC-DC converter is outside the ZVS operation range if a load that is lightly loaded is connected to the two-level DC-DC converter when the input-output voltage ratio is high, the ZVS operation may be disabled. As a result, the reactive current that does not contribute to transmitted power is increased to degrade the transmission efficiency of the DC-DC converter. In contrast, in the present embodiment, the determination of the operation mode of the DC-DC converter 1 in accordance with the load variation enables the DC-DC converter 1 to operate with high efficiency. A method of determining the operation mode of the full-bridge circuit 10 will now be described.

Figure 13:
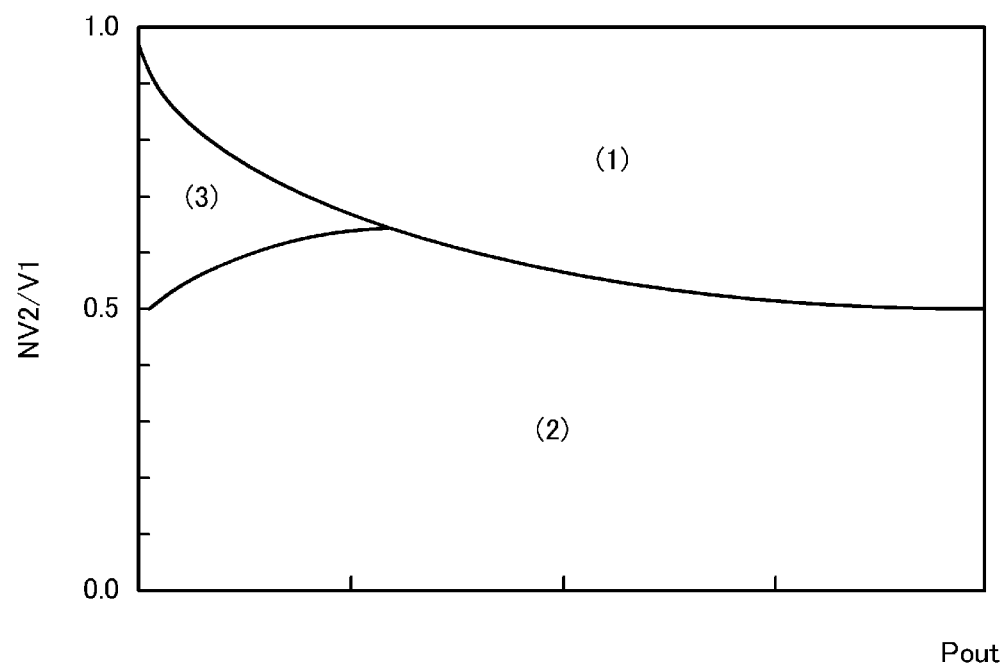
FIG. 13 is a graph illustrating the relationship between output voltage from the DC-DC converter 1 and an input-output voltage ratio.

FIG. 13 is a graph illustrating the relationship between output voltage Pout from the DC-DC converter 1 and the input-output voltage ratio. The input-output voltage ratio is represented by NV2/V1. Here, N denotes the turn ratio (N:1) between the primary winding n1 and the secondary winding n2 of the transformer T1. An area (1) is the control range of the full-bridge operation mode, an area (2) is the control range of the half-bridge operation mode, and an area (3) is the control range of the five-level operation mode.

For example, when NV2/V1=1.0, the operation mode of the DC-DC converter 1 is set to the full-bridge operation mode. When NV2/V1<0.6, the operation mode of the DC-DC converter 1 is set to the half-bridge operation mode in an area excepting the area (3). When NV2/V1<1.0, the operation mode of the DC-DC converter 1 is set to the five-level operation mode in an area outside the areas (1) and (2).

Since determining the operation mode based on the input-output voltage ratio and the output voltage Pout in the above manner enables the ZVS operation to be performed in a wide variation range of the load, it is possible to suppress the reactive current to operate the DC-DC converter 1 with high efficiency. In addition, the zero voltage switching is enabled in the present embodiment even in the area (3) in which the zero voltage switching is disabled in the two-level DC-DC converter in the related art, thus enabling the zero voltage switching in a wide variation range of the load.

For example, in the half-bridge operation mode, switching control in which the switching elements Q1, Q2, Q6, and Q8 and the switching elements Q3, Q4, Q5, and Q7 are alternately turned on and off may be adopted, instead of the method of alternately turning on and off the switching elements Q1, Q3, Q7, and Q8 and the switching elements Q2, Q4, Q5, and Q6. In this case, the voltage Vo=±V1/2 because the current flows through the second charge-discharge capacitor Cf2.

Although the full-bridge circuit 10 in the DC-DC converter 1 is configured so as to operate in any of the full-bridge operation mode, the half-bridge operation mode, and the five-level operation mode in the present embodiment, the full-bridge circuit 10 may be configured so as to operate in the full-bridge operation mode or the half-bridge operation mode. Also in this case, since it is not necessary to provide two circuits of a full-bridge circuit and a half-bridge circuit, increase in the size of the DC-DC converter 1 is suppressed.

Although the direct-current voltage V1 is applied to both ends of the primary winding of the transformer in the full-bridge operation mode and half of the direct-current voltage (V1/2) is applied to both ends of the primary winding of the transformer in the half-bridge operation mode in the embodiment described above, these voltages may include some errors. For example, a case is included in which the voltage V1 and the voltage V1/2 are varied due to a variation in the parasitic capacitance of the FET, a manufacturing error, and so on.

REFERENCE SIGNS LIST

C1 input capacitor
C2 input capacitor
Cf1 first charge-discharge capacitor
Cf2 second charge-discharge capacitor
L1 resonant coil
Q1 to Q12 switching element
T1 transformer
1 DC-DC converter
IO1, IO2, IO3, IO4 input-output terminal
n1 primary winding
n2 secondary winding
10, 20 full-bridge circuit
21 output voltage detection circuit
22 load current detection circuit
31, 32 control unit

The invention claimed is:
1. A direct current-to-direct current converter comprising:
an input configured to receive a direct-current voltage V1;
an output configured to output a direct-current voltage V2;
a first full-bridge circuit connected to the input;
a second full-bridge circuit connected to the output;

a transformer having a first winding connected to the first full-bridge circuit and a second winding connected to the second full-bridge circuit; and a controller configured to perform switching control of the first full-bridge circuit, wherein the first full-bridge circuit includes:

a first series circuit including first, second, third and fourth switching elements sequentially connected in series to each other, a second series circuit connected in parallel to the first series circuit and including fifth, sixth, seventh and eighth switching elements sequentially connected in series to each other, a first floating capacitor connected to a first node between the first and second switching elements and a second node between the third and fourth switching elements, and a second floating capacitor connected to a third node between the fifth and sixth switching elements and a fourth node between the seventh and eighth switching elements, wherein a first end of the first winding of the transformer is connected to a fifth node between the second and third switching elements and a second end of the first winding of the transformer is connected to a sixth node between the sixth and seventh switching elements, and wherein the controller performs the switching control of the first full-bridge circuit in at least two modes including a full-bridge operation mode in which the first to eighth switching elements are controlled so that the direct-current voltage V1 is applied to the first and second ends of the first winding of the transformer and a half-bridge operation mode in which the first to eighth switching elements are controlled so that half of the direct-current voltage V1 is applied to the first and second ends of the first winding of the transformer.

2. The direct current-to-direct current converter according to claim 1, wherein the controller performs the switching control to output voltages at five levels from the first full-bridge circuit by switching between the full-bridge operation mode and the half-bridge operation mode during one period of a driving frequency of the first full-bridge circuit.

3. The direct current-to-direct current converter according to claim 1, wherein the input is a first input-output unit through which direct-current voltage is input and output.

4. The direct current-to-direct current converter according to claim 3, wherein the output is a second input-output unit through which direct-current voltage is input and output, and the voltage input through the first input-output unit is higher than the voltage input through the second input-output unit.

5. The direct current-to-direct current converter according to claim 1, further comprising a load current detector that detects current flowing through a load connected to the output.

6. The direct current-to-direct current converter according to claim 5, wherein the controller switches between the full-bridge operation mode and the half-bridge operation mode based on a result detected by the load current detector.

7. The direct current-to-direct current converter according to claim 1, wherein the second full-bridge circuit includes:

ninth and tenth switching elements sequentially connected in series to each other; and eleventh and twelfth switching elements sequentially connected in series to each other, wherein the ninth and tenth switching elements are connected in parallel to the eleventh and twelfth switching elements.

8. The direct current-to-direct current converter according to claim 7, wherein a first end of the second winding of the transformer is connected to a seventh node between the ninth and tenth switching elements and a second end of the second winding of the transformer is connected to an eighth node between the eleventh and twelfth switching elements.

9. The direct current-to-direct current converter according to claim 8, wherein the output is connected in parallel with the ninth and tenth switching elements and with the eleventh and twelfth switching elements.

10. A direct current-to-direct current converter comprising:

a first full-bridge circuit including:

a first series circuit including first, second, third and fourth switching elements sequentially connected in series to each other, a second series circuit connected in parallel to the first series circuit and including fifth, sixth, seventh and eighth switching elements sequentially connected in series to each other, a first floating capacitor connected to a node between the first and second switching elements and a node between the third and fourth switching elements, and a second floating capacitor connected to a node between the fifth and sixth switching elements and a node between the seventh and eighth switching elements;

a second full-bridge circuit;

a transformer having a first winding connected to the first full-bridge circuit and a second winding connected to the second full-bridge circuit;

an input connected in parallel to the first full-bridge circuit and configured to receive a direct-current voltage V1 as an input voltage; and a controller configured to perform switching control of the first full-bridge circuit in at least two modes including a full-bridge operation mode in which the first to eighth switching elements are controlled so that the received direct-current voltage V1 is applied to the first winding of the transformer and a half-bridge operation mode in which the first to eighth switching elements are controlled so that half of the direct-current voltage V1 is applied to the first winding of the transformer.

11. The direct current-to-direct current converter according to claim 10, wherein a first end of the first winding of the transformer is connected to a node between the second and third switching elements and a second end of the first winding of the transformer is connected to a node between the sixth and seventh switching elements.

12. The direct current-to-direct current converter according to claim 10, wherein the controller performs the switching control to output voltages at five levels from the first full-bridge circuit by switching between the full-bridge operation mode and the half-bridge operation mode during one period of a driving frequency of the first full-bridge circuit.

13. The direct current-to-direct current converter according to claim 10, wherein the input is a first input-output unit through which direct-current voltage is input and output.

14. The direct current-to-direct current converter according to claim 13, further comprising an output connected in parallel to the second full-bridge circuit, the output being a second input-output unit through which direct-current voltage is input and output, and wherein the voltage input through the first input-output unit is higher than the voltage input through the second input-output unit.

15. The direct current-to-direct current converter according to claim 14, further comprising a load current detector that detects current flowing through a load connected to the output, wherein the controller switches between the full-bridge operation mode and the half-bridge operation mode based on a result detected by the load current detector.

16. A direct current-to-direct current converter comprising:
    an input configured to receive a direct-current voltage V1;
    an output configured to output a direct-current voltage V2;
    a first full-bridge circuit including:
        a first series circuit including a first plurality of switching elements sequentially connected in series to each other, and
        a second series circuit connected in parallel to the first series circuit and including a second plurality of switching elements sequentially connected in series to each other;
    a second full-bridge circuit;
    a transformer having a first winding connected to the first full-bridge circuit and a second winding connected to the second full-bridge circuit; and
    a controller configured to perform switching control of the first full-bridge circuit in at least two modes including a full-bridge operation mode in which the first and second plurality of switching elements are controlled so that the direct-current voltage V1 is applied to the first winding of the transformer and a half-bridge operation mode in which the first and second plurality of switching elements are controlled so that half of the direct-current voltage V1 is applied to the first winding of the transformer
    wherein the controller is configured to perform the switching control to output voltages at five levels from the first full-bridge circuit by switching between the full-bridge operation mode and the half-bridge operation mode during one period of a driving frequency of the first full-bridge circuit.

17. The direct current-to-direct current converter according to claim 16, further comprising:
    a first floating capacitor connected between a first pair of the first plurality of switching elements and a second pair of the first plurality of switching elements, and
    a second floating capacitor connected between a first pair of the second plurality of switching elements and a second pair of the second plurality of switching elements.

18. The direct current-to-direct current converter according to claim 16,
    wherein the input is a first input-output unit through which direct-current voltage is input and output,
    wherein the output is a second input-output unit through which direct-current voltage is input and output, and
    wherein the voltage input through the first input-output unit is higher than the voltage input through the second input-output unit.

* * * * *